United States Patent Office 3,385,711
Patented May 28, 1968

3,385,711
ORANGE JUICE PROCESS
George S. Sperti, Cincinnati, Ohio, assignor to Institutum Divi Thomae Foundation, Cincinnati, Ohio, a corporation of Ohio
No Drawing. Filed June 3, 1964, Ser. No. 372,388
6 Claims. (Cl. 99—105)

ABSTRACT OF THE DISCLOSURE

Certain oranges produce a juice which, while perfectly palatable at the time it is expressed from the fruit, soon becomes bitter. Applicant has discovered that the bitterness precursors are in the juice pulp. The process of the invention involves expressing the juice from the fruit in the usual manner, then immediately separating the juice pulp from the liquid components of the juice, and then replacing this pulp with either a juice pulp which never had any bitterness precursor in it, or with a juice pulp from which the bitterness precursor had been removed before bitterness developed. In the latter situation such removal is by prompt washing solely with water as the solvent, and preferably at elevated temperatures.

---

The invention relates to the production of orange juice and orange juice concentrates which will remain palatable throughout reasonable periods of storage under proper storage conditions.

In the manufacture of orange juice, it is usual to pass the fruits through juicing machines. The liquid product may be treated for the removal of excess quantities of pulp; and the juice may be given other treatments if desired, such as pasteurization and irradiation with ultraviolet light. The juice is then normally stored under conditions of refrigeration.

Where the product is to be used at a considerable distance from its place of origin, or where the storage period is likely to be prolonged, it is generally preferred to form a concentrate. There are various methods of forming concentrates. Reference may be made to Patent No. 2,588,337 in the name of the present inventor, and to Patent No. 2,967,778 in the names of Cole, Walker and Reed. The actual steps employed in forming the concentrate do not constitute a limitation on the present invention.

The problem to which this invention is addressed arises over the fact that the juice of certain oranges, although palatable at the outset, soon develop a pronounced bitterness even when stored at deep freeze temperatures.

The Florida navel orange is an example. The Italian blonde orange is another. The juices of both of these fruits are palatable when first extracted, but they both develop bitterness within a very short time.

A primary object of this invention is the provision of a method whereby juices or concentrates may be derived from these fruits, which juices and concentrates are not only palatable at the outset but which have excellent keeping qualities.

This object and other objects of the invention which will be set forth hereinafter or will be apparent to one skilled in the art upon reading these specifications, are accomplished by those procedures and in those products of which certain exemplary embodiments will now be described.

The invention is based on certain discoveries as the result of research. It is not known precisely what change of a chemical nature occurs in the juice products of certain oranges to produce the bitterness; but it has been ascertained that in some cases at least the change itself is associated with the pulp (obviously this is the juice pulp), not with the liquid components of the juice. Thus the juices of the named fruits remain palatable and have satisfactory storage life if they are freed from the pulp component as by centrifuging.

An orange juice or concentrate consisting of the liquid component alone is not generally desirable because the public has come to expect a certain quantity of relatively finely divided pulp in the product at the time it is consumed. It has further been ascertained that the pulp itself (obviously this is the juice pulp), after separation from the liquid component, can be so treated as to be freed of the tendency to develop bitterness. Unexpectedly, it has been found that a suitable treatment is a washing of the pulp solely with either warm or cold water. Pulp so treated may be added back to the liquid component either as a whole or in such quantity as may be desired; and the combined product will have a good storage life.

In one embodiment of the invention which may be taken as exemplary herein, orange juice as it is expressed from fruits known to develop the bitterness characteristic is centrifgued, filtered, or decanted for the separation of the pulp. Obviously, this the the juice pulp. The term "expressed" as used herein is intended to refer to the extraction of the juice from the fruits by ordinary juicing operations either by hand or by machine. The juicing operation is not of a kind, however, to include in the product constituents of the rind, the skin, or the more fibrous portions of the fruits. Since, as above indicated, a certain quantity of pulp is expected and desired both in orange juice as such and in concentrates, it has been found entirely possible to treat the liquid component of the expressed juice with pulp derived from types of citrus fruits which do not develop the bitterness characteristic. There is always an excess quantity of pulp from oranges which do not develop the bitterness characteristic available on the market at a very reasonable price, because it is not the general practice to add back to the liquid component all of the pulp normally contained in the expressed juice.

Instead of the practice outlined above, the separated pulp from oranges which develop the bitterness characteristic may be treated for the removal of factors producing bitterness by a washing operation. Broadly speaking this operation is accomplished by agitating the pulp successively in several volumes of water.

Agitation may be accomplished mechanically as by the use of stirring or shaking; or it may be achieved by boiling the pulp in water. Agitation which would tend to crush or comminute the particles of the pulp is to be avoided, since it is believed that a crushed or bruised pulp has a greater tendency to become bitter upon aging. A treatment in water at an elevated temperature appears to be helpful. While washing with water at ordinary or room temperatures is in most instances effective, it may be that the bitterness characteristic is in part destroyed or decomposed by elevated temperatures. Instead of boiling, the mixture of pulp in water may be treated in an autoclave or washed by passing live steam through it. In either of the latter instances the temperature of the pulp may be raised to the boiling point of water or thereabove; but good effects are attained by temperatures higher than room temperature and below 212° F.

The use of elevated temperatures as in boiling, or treatment with steam or hot water, appears to assist in the removal of the bitterness-developing factors. Boiling may be combined with mechanical agitation. An effective treatment is to boil the pulp in one or two volumes of water, separate the water from the pulp by centrifuging, then reboil the pulp in another similar quantity of water, and again separate the water from the pulp. The bitterness producing factors are, surprisingly, responsive to a washing treatment, after which the pulp will not develop further bitterness when mixed with the orange juice, unless the pulp be bruised or crushed. The washing liquid, i.e., water, will be discarded after removal from the pulp.

The washing treatments hereinabove outlined are sufficient to remove the bitterness producing factors in commercial practice. However, the washing treatments may be prolonged by repetition as desired. The development of bitterness in the pulp after removal from the liquid component of the juice occurs quite rapidly and is progressive if the pulp is not treated as indicated. By the same token, it becomes possible to gauge the extent of the treatment by tasting the pulp and repeating washing operations until the bitterness is no longer detected. The pulp as a result of washing tends to become tasteless; but it retains the greater part of its color. It is still capable therefore of serving as a satisfactory bodying agent for the liquid component of the juice or concentrate.

The volume of water used in washing may be considerably varied; but it is more effective to wash the pulp with more than one increment of fresh water than to treat the pulp a single time with the same total quantity of water.

The pulp may be screened to remove larger particles either before or after the treatment set forth. It follows from what has been taught above that the juice product, whether made by adding the treated pulp back to the juice from which it was separated or whether the liquid component is first concentrated, should not thereafter be subjected to homogenization or any other treatment which would bruise or crush the pulp particles. Neither should a treated pulp, i.e., a pulp which has been freed of the tendency to develop bitterness in the ways set forth above, be subjected to any such treatment.

It is within the purview of this invention, however, to separate the expressed juice of oranges having a tendency to develop bitterness into a liquid component and a pulp component by centrifuging, filtering or decanting, and to subject the pulp component to maceration, homogenization, or any other refining treatment involving crushing or bruising, thereafter freeing the pulp from the bitterness characteristic by washing, boiling or steaming as set forth above, providing the treatment to remove the bitterness characteristic follows any treatment in which the pulp is macerated.

EXAMPLE I

Florida navel oranges were squeezed, and the juice (which contained suspended pulp) was centrifuged to remove the pulp. The pulp after such removal was suspended in water and boiled therein for thirty minutes. After cooling the pulp was separated from the water by centrifuging for twenty minutes.

At this time neither the water separated from the pulp nor the pulp itself was characterized by any very great bitterness. However, to insure complete removal of the bitter material, the same pulp was re-suspended in water at room temperature; and the pulp-water mixture was agitated for thirty minutes on a mechanical shaker. The retreated pulp was then separated from the water by centrifuging for twenty minutes. Neither the second increment of water nor the pulp itself was bitter at this stage. The pulp retained its natural color.

The initial orange juice from which the pulp had been separated, and the pulp itself (treated as above set forth) were each separately stored in suitable containers in frozen condition. Neither substance developed bitterness during this storage. On the other hand, control samples of juice expressed at the same time but stored without removal of the pulp become extremely bitter. The juice from which the pulp was separated for treatment and the treated pulp also keep well in combination.

Results similar to those set forth above have been achieved with the juice and pulp of Italian blonde oranges.

Experience with the practice of the process indicates that best results are obtained when the separation of the pulp from the liquid juice occurs as promptly as possible after the juice is expressed; and experience has also indicated that for best results the separated pulp should be treated as promptly as possible. Extreme bitterness will develop in a juice from which the pulp has not been extracted as well as in the extracted pulp itself. In general, extereme bitterness in the juice and pulp of the named fruits will develop within as little as twelve hours despite refrigeration.

EXAMPLE II

An attempt was made to produce a satisfactory juice from frozen Italian oranges. Such frozen oranges did not produce a satisfactory juice. This is believed to be the result of loosening the white layer or albedo under the skin of the orange by the freezing temperatures involved. The substance of this white layer, which becomes mixed with the juice during the squeezing, is believed to be responsible for the fact that the juice itself after the separation of the pulp therefrom as taught above, developed detectable bitterness and a white chalky precipitate upon storage under refrigeration for about twelve hours, although the juice itself was not bitter immediately after squeezing. Filtration of the juice to remove the precipitate did not result in a significant flavor improvement. Bitterness continued to increase over a storage period of about three days.

Where the juice is expressed from non-frozen oranges the above difficulties are not encountered. Where the pulp is expressed from the juice promptly, the juice itself does not develop bitterness upon storage. The derivation of the pulp from frozen or non-frozen oranges appears to make little difference in the effect of the treatments taught herein for de-bittering. For example, the bitter pulp which had been stored for three days under refrigeration as set forth above could be de-bittered by two successive boiling and centrifuging treatments as above described, followed by a shaking of the pulp for fifteen minutes in hot water. Thus while the pulp can be de-bittered even when derived from frozen oranges, it will be evident that the use of frozen oranges should be avoided since the freezing produces a juice which even in the absence of the pulp tends to become bitter upon storage.

It has been indicated above that a palatable juice with good keeping characteristics and freedom from bitterness can be obtained from the Florida navel and Italian blonde oranges and similar species by separating the pulp from the juice as promptly as possible. The pulp can be de-bittered as taught and then added back to the original juice in whole or in part. It is also possible to use a pulp from a type of fruit which does not develop bitterness on storage; and all of these things may be done as well in making a concentrate as in making a juice product of the Brix value of freshly expressed juice, say about 12°.

Modifications may be made in the invention without departing from the spirit of it.

The embodiments of the invention in which an exclusive property or privilege is claimed are defined as follows:

1. A process for producing an orange juice product with good keeping properties from an orange juice known to develop bitterness characteristics on storage, which comprises the steps of expressing the juice from oranges, the juice of which turns bitter on storage, said juice comprising liquid and pulp components, promptly thereafter separating said liquid and pulp components before bitterness develops by the step of centrifuging, decanting, or filtering, and then promptly washing only said pulp to remove said bitter principal solely with water, and adding at least a part of said washed pulp component back to said liquid component.

2. The process claimed in claim 1 wherein the separated pulp is subjected to maceration occurring wholly prior to the said washing.

3. The process claimed in claim 1 wherein the pulp component is successively washed in several increments of water at least substantially equal in volume to the volume of the pulp component, the water being separated and discarded after each such washing.

4. The process claimed in claim 1 wherein the pulp component is submerged in at least about an equal volume of water and the mixture brought to a boil, after which the water is separated from the pulp, another similar volume of water added to the pulp and the mixture brought to a boil, the last mentioned volume of water being separated from the pulp before addition of the pulp to the liquid component.

5. The process claimed in claim 1 wherein the step of washing said pulp component with water includes the step of boiling, autoclaving, or washing with live steam.

6. A process for producing an orange juice product from oranges known to develop bitterness characteristics comprising the steps of expressing the juice from said oranges, said juice comprising liquid and juice pulp components, promptly thereafter separating said liquid and pulp components before bitterness develops, and adding to said liquid component pulp from oranges free from bitterness characteristics.

References Cited
UNITED STATES PATENTS

| | | | |
|---|---|---|---|
| 1,848,760 | 3/1932 | Willison | 99—105 |
| 2,816,033 | 12/1957 | Pritchett | 99—105 |

A. LOUIS MONACELL, *Primary Examiner.*

M. VOET, *Assistant Examiner.*